United States Patent
Dell et al.

(10) Patent No.: US 10,125,856 B2
(45) Date of Patent: Nov. 13, 2018

(54) ISOLATOR WITH DUAL SPRINGS

(71) Applicant: Litens Automotive Partnership, Woodbridge (CA)

(72) Inventors: James W. Dell, Newmarket (CA); Boris Replete, Toronto (CA)

(73) Assignee: Litens Automotive Partnership, Woodbridge (CA)

( * ) Notice: Subject to any disclaimer, the term of this patent is extended or adjusted under 35 U.S.C. 154(b) by 169 days.

(21) Appl. No.: 15/035,688

(22) PCT Filed: Nov. 10, 2014

(86) PCT No.: PCT/CA2014/000812
§ 371 (c)(1),
(2) Date: May 10, 2016

(87) PCT Pub. No.: WO2015/066800
PCT Pub. Date: May 14, 2015

(65) Prior Publication Data
US 2016/0265643 A1    Sep. 15, 2016

Related U.S. Application Data

(60) Provisional application No. 61/902,248, filed on Nov. 10, 2013.

(51) Int. Cl.
*F16D 3/00* (2006.01)
*F16H 55/14* (2006.01)
(Continued)

(52) U.S. Cl.
CPC ............. *F16H 55/36* (2013.01); *B60K 25/02* (2013.01); *F16D 3/10* (2013.01); *F16D 3/12* (2013.01);
(Continued)

(58) Field of Classification Search
CPC .. F16H 2055/366; F16H 55/36; F16F 15/123; F16D 3/66; F16D 7/022
(Continued)

(56) References Cited

U.S. PATENT DOCUMENTS 306,267 A * 10/1884 La Turno .................. F16D 3/66
464/67.1
608,770 A * 8/1898 Godfray .................... F16D 3/66
464/67.1
(Continued)

FOREIGN PATENT DOCUMENTS

CA    2753767 A1    9/2010
CA    2802116 A1    12/2011
(Continued)

OTHER PUBLICATIONS

Extended European Search Report for EP103806 dated Jul. 7, 2017.
(Continued)

*Primary Examiner* — Henry Y Liu
(74) *Attorney, Agent, or Firm* — Millman IP Inc.

(57) ABSTRACT

In an aspect, an isolator is provided, comprising a hub, a pulley, an isolation spring and a transition spring. The hub defines an axis and is connectable to a rotatable shaft of a rotary device. The pulley is rotatably mounted to the hub. The isolation spring and transition spring act in series in a torque path between the pulley and the hub. The isolation spring has a first spring rate. The transition spring has a second spring rate that is lower than the first spring rate.

18 Claims, 16 Drawing Sheets

(51) Int. Cl.
| | |
|---|---|
| *F16H 55/36* | (2006.01) |
| *B60K 25/02* | (2006.01) |
| *F16D 3/10* | (2006.01) |
| *F16D 3/12* | (2006.01) |
| *F16F 15/123* | (2006.01) |
| *F16H 7/20* | (2006.01) |
| *F02B 67/06* | (2006.01) |

(52) U.S. Cl.
CPC ...... *F16F 15/123* (2013.01); *F16F 15/12366* (2013.01); *F16H 7/20* (2013.01); *F02B 67/06* (2013.01); *F16H 2055/366* (2013.01)

(58) Field of Classification Search
USPC .......................................................... 474/94
See application file for complete search history.

(56) References Cited

U.S. PATENT DOCUMENTS

| | | | | |
|---|---|---|---|---|
| 1,254,542 A * | 1/1918 | Schwinn | ............... | F16D 3/66 222/360 |
| 1,518,360 A * | 12/1924 | Royce | ............... | F01L 1/02 192/55.61 |
| 3,556,273 A | 1/1971 | Luk | | |
| 3,666,021 A | 5/1972 | Whitehouse | | |
| 4,092,837 A | 6/1978 | Gerbauer et al. | | |
| 4,483,685 A | 11/1984 | Spasiano et al. | | |
| 4,591,868 A | 5/1986 | Cusey et al. | | |
| 4,690,256 A | 9/1987 | Bopp et al. | | |
| 4,747,801 A * | 5/1988 | Chasseguet | ....... | F16F 15/13446 192/205 |
| 5,048,657 A | 9/1991 | Dissett et al. | | |
| 5,307,710 A * | 5/1994 | Feldhaus | ............... | F16F 15/134 464/68.3 |
| 5,355,747 A * | 10/1994 | Kajitani | ............ | F16F 15/13484 192/208 |
| 5,377,560 A * | 1/1995 | Schierling | ......... | F16F 15/13438 192/213 |
| 5,380,248 A * | 1/1995 | Kraus | ................. | F16F 15/1343 464/66.1 |
| 5,893,355 A | 4/1999 | Glover et al. | | |
| 5,964,674 A | 10/1999 | Serkh et al. | | |
| 6,044,943 A * | 4/2000 | Bytzek | .................... | F16D 41/20 192/212 |
| 6,083,130 A | 7/2000 | Mevissen et al. | | |
| 6,131,487 A * | 10/2000 | Jackel | ................ | F16F 15/1343 192/106 R |
| 6,161,512 A * | 12/2000 | Beels Van Heemstede ................ F16F 15/1232 123/192.1 | | |
| 6,244,577 B1 | 6/2001 | Bucholtz | | |
| 6,308,678 B1 * | 10/2001 | Haas | ............... | F02B 67/08 123/192.1 |
| 6,712,706 B2 * | 3/2004 | Jackel | ....................... | F16F 1/13 192/214.1 |
| 7,153,227 B2 | 12/2006 | Dell et al. | | |
| 7,204,772 B2 | 4/2007 | Huber | | |
| 7,207,910 B2 | 4/2007 | Dell et al. | | |
| 7,217,204 B2 | 5/2007 | Roby | | |
| 7,343,832 B2 * | 3/2008 | Jaeckel | ............... | F16F 15/1343 74/573.12 |
| 7,510,062 B2 | 3/2009 | Derr | | |
| 7,624,852 B2 * | 12/2009 | Mevissen | ................ | F16D 7/022 192/41 S |
| 7,708,661 B2 | 5/2010 | Pflug et al. | | |
| 7,878,315 B2 | 2/2011 | Saito et al. | | |
| 7,891,475 B2 | 2/2011 | Zhu et al. | | |
| 7,892,124 B2 | 2/2011 | Hodjat et al. | | |
| 7,954,613 B2 * | 6/2011 | Mevissen | ................ | F16D 7/022 192/41 S |
| 7,966,817 B2 * | 6/2011 | Schenck | ............... | F02B 41/10 184/6.12 |
| 8,021,253 B2 | 9/2011 | Dell et al. | | |
| 8,028,602 B2 | 10/2011 | Crist | | |
| 8,038,554 B2 | 10/2011 | Watababe et al. | | |
| 8,192,312 B2 | 6/2012 | Ali et al. | | |
| 8,276,720 B2 | 10/2012 | Farahati et al. | | |
| 8,313,385 B2 * | 11/2012 | Mundt | ............... | F16F 15/1217 192/3.29 |
| 8,313,400 B2 | 11/2012 | Serkh et al. | | |
| 8,419,574 B2 | 8/2013 | Serkh et al. | | |
| 8,632,431 B2 * | 1/2014 | Pflug | ..................... | F16H 55/36 474/94 |
| 8,677,849 B2 * | 3/2014 | Simpson | ............. | F16F 15/1421 123/90.31 |
| 8,771,088 B2 * | 7/2014 | Takikawa | ................ | F16H 45/02 464/68.8 |
| 8,863,925 B2 * | 10/2014 | Antchak | ............... | B60K 25/00 192/110 B |
| 9,163,713 B2 * | 10/2015 | Yoon | ...................... | F16H 55/36 |
| 9,194,438 B2 * | 11/2015 | Dell | .................... | F16F 15/1232 |
| 9,234,549 B2 * | 1/2016 | Torno | ....................... | F16D 3/12 |
| 9,441,681 B2 * | 9/2016 | Williams | ............... | B60K 25/02 |
| 9,726,253 B2 * | 8/2017 | Yoon | ..................... | F16F 15/123 |
| 9,797,498 B2 * | 10/2017 | Starodoubov | ........... | F16H 55/36 |
| 2002/0019263 A1 * | 2/2002 | Jackel | ................ | F16F 15/1343 464/67.1 |
| 2004/0014540 A1 | 1/2004 | Dell et al. | | |
| 2004/0226393 A1 | 11/2004 | Hong | | |
| 2006/0122014 A1 | 6/2006 | Kamdem | | |
| 2006/0172832 A1 | 8/2006 | Watanabe et al. | | |
| 2006/0264280 A1 | 11/2006 | Dell et al. | | |
| 2007/0037644 A1 * | 2/2007 | Mevissen | ................ | F16D 7/022 474/70 |
| 2008/0139351 A1 | 6/2008 | Pflug et al. | | |
| 2008/0312014 A1 * | 12/2008 | Stief | ..................... | F16F 15/123 474/94 |
| 2008/0318715 A1 * | 12/2008 | Pflug | ..................... | F16H 55/36 474/100 |
| 2009/0022377 A1 | 1/2009 | Matsue et al. | | |
| 2009/0107791 A1 | 4/2009 | Zhu et al. | | |
| 2009/0121401 A1 * | 5/2009 | Lehmann | ................... | F16D 3/66 267/215 |
| 2009/0176583 A1 | 7/2009 | Dell et al. | | |
| 2009/0194380 A1 | 8/2009 | Ali et al. | | |
| 2009/0223775 A1 | 9/2009 | Hodjat et al. | | |
| 2010/0032258 A1 | 2/2010 | Mevissen et al. | | |
| 2010/0099527 A1 | 4/2010 | Rolando | | |
| 2010/0120563 A1 | 5/2010 | Serkh et al. | | |
| 2010/0167856 A1 * | 7/2010 | Hartmann | ............... | F02B 63/04 474/94 |
| 2011/0245000 A1 | 10/2011 | Serkh et al. | | |
| 2011/0256968 A1 | 10/2011 | Serkh et al. | | |
| 2011/0263365 A1 * | 10/2011 | Mende | ................ | F16F 15/1297 474/94 |
| 2011/0315502 A1 * | 12/2011 | Antchak | ............... | F16D 7/022 192/75 |
| 2012/0015768 A1 | 1/2012 | Serkh et al. | | |
| 2012/0088616 A1 | 4/2012 | Ali et al. | | |
| 2012/0094791 A1 | 4/2012 | Lee | | |
| 2012/0149511 A1 | 6/2012 | Hodjat | | |
| 2013/0098733 A1 | 4/2013 | Antchak et al. | | |
| 2016/0123453 A1 * | 5/2016 | Starodoubov | .......... | B60K 25/02 474/94 |
| 2016/0201757 A1 * | 7/2016 | Tran | ........................ | F16D 3/10 474/94 |

FOREIGN PATENT DOCUMENTS

| | | |
|---|---|---|
| CN | 101275612 A | 10/2008 |
| CN | 101915298 A | 12/2010 |
| CN | 102341610 A | 2/2012 |
| DE | 21202 | 4/1961 |
| DE | 4424988 C1 | 6/1995 |
| DE | 19730001 A1 | 1/1999 |
| DE | 19912970 A1 | 9/1999 |
| DE | 19919449 A1 | 11/1999 |
| DE | 102005016897 A1 | 10/2006 |
| DE | 102005062318 A1 | 7/2007 |
| DE | 102006039362 A1 | 3/2008 |

(56) References Cited

FOREIGN PATENT DOCUMENTS

| | | |
|---|---|---|
| DE | 102007058018 A1 | 7/2008 |
| DE | 102008059263 A1 | 6/2009 |
| DE | 102009039989 A1 | 4/2010 |
| DE | 102009052058 A1 | 6/2010 |
| DE | 102010023714 A1 | 1/2011 |
| EP | 0349267 A1 | 6/1989 |
| EP | 0934843 B1 | 5/2004 |
| EP | 1645783 A1 | 4/2006 |
| EP | 1662161 A1 | 5/2006 |
| EP | 01710465 B1 | 11/2006 |
| EP | 1939494 A2 | 7/2008 |
| EP | 2148109 A1 | 1/2010 |
| EP | 2255100 A1 | 12/2010 |
| EP | 2273144 A1 | 1/2011 |
| EP | 2235400 A4 | 6/2011 |
| EP | 01621796 B1 | 10/2011 |
| EP | 2203655 B1 | 3/2012 |
| EP | 2638304 A1 | 9/2013 |
| EP | 2556274 B1 | 5/2014 |
| EP | 2558749 B1 | 6/2014 |
| EP | 2010762 B1 | 3/2015 |
| EP | 2010792 B1 | 3/2015 |
| GB | 2308173 A | 6/1997 |
| KR | 1020110131197 A | 12/2011 |
| WO | 19911010075 A1 | 7/1991 |
| WO | 9612122 A1 | 4/1996 |
| WO | 9821062 A1 | 5/1998 |
| WO | 03046407 A1 | 6/2003 |
| WO | 2005005865 A1 | 1/2005 |
| WO | 2005028899 A1 | 3/2005 |
| WO | 2007074016 A1 | 7/2007 |
| WO | 2007077414 A1 | 7/2007 |
| WO | 2007077415 A1 | 7/2007 |
| WO | 2007121582 A1 | 11/2007 |
| WO | 2008002845 A2 | 1/2008 |
| WO | 2008022897 A1 | 2/2008 |
| WO | 2008049388 A2 | 5/2008 |
| WO | 2008058499 A2 | 5/2008 |
| WO | 2008067915 A1 | 6/2008 |
| WO | 2008071306 A1 | 6/2008 |
| WO | 2009099504 A2 | 8/2009 |
| WO | 2009111036 A1 | 9/2009 |
| WO | 2010005880 A1 | 1/2010 |
| WO | 2010099605 A1 | 9/2010 |
| WO | 2011126916 A1 | 10/2011 |
| WO | 2011130106 A1 | 10/2011 |
| WO | 2011160215 A1 | 12/2011 |
| WO | 201209314 A1 | 1/2012 |
| WO | 2012061930 A1 | 5/2012 |
| WO | 2012082479 A1 | 6/2012 |
| WO | 2013033825 A1 | 3/2013 |
| WO | 2013124009 A1 | 8/2013 |
| WO | 2014186876 A1 | 11/2014 |

OTHER PUBLICATIONS

Extended European Search Report for EP14859575 dated Jun. 6, 2017.
Office Action for CN201480029125.5 dated Jul. 24, 2017.
Office Action for CN201480029125.5 dated Jul. 24, 2017—English Translation.
Office Action for CN201480041408.1 dated Aug. 21, 2017.
Office Action for CN201480041408.1 dated Aug. 21, 2017—English Translation.
Installation Instructions for KPMI Part No. 90/9034 BMW (Lightweight Racing Vale Spring Kit), May 23, 2005, Kibblewhite Precision Machining, Inc.
International Search Report and Written Opinion for PCT/CA2014/000456, dated Sep. 3, 2014, ISA.
Office Action for CN201480041438.2 dated Mar. 2, 2017.
Office Action for CN201480041438.2 dated Mar. 2, 2017—English translation.
Reporting letter for Office Action for CN201480041438.2 dated Mar. 28, 2017.
English translation of Office Action for CN201380053505.8 dated Apr. 12, 2016.
International Search Report for PCT/CA2013/000881 dated Jan. 28, 2014.
Office Action for CN201380053505.8 dated Apr. 12, 2016.
Office Action for U.S. Appl. No. 14/470,937 dated Jan. 29, 2016.
International Preliminary Report on Patentability for PCT/CA2013/000881 dated Apr. 15, 2015.
ISR & WO for PCT/CA2014/000592 dated Oct. 29, 2014.
Extend European search report for EP3025072 dated Feb. 17, 2017.
Office Action for CN201380053505.8 dated Feb. 23, 2017.
Office Action for CN201380053505.8 dated Feb. 23, 2017, English translation.

* cited by examiner

ISOLATOR WITH DUAL SPRINGS

CROSS-REFERENCE TO RELATED APPLICATIONS

This application claims the benefit of US Provisional Application No. 61/902,248, filed Nov. 10, 2013, the contents of which are incorporated herein by reference in their entirety.

FIELD OF INVENTION

This disclosure relates generally to the field of isolators for use between an engine crankshaft and a belt or other endless drive member, or between a shaft of an accessory such as an MGU or alternator and the endless drive member.

BACKGROUND OF INVENTION

It is known to provide an isolator on an engine crankshaft or on a belt-driven accessory, such as an MGU (motor generator unit) or an alternator, that is driven by a belt from the crankshaft of an engine in a vehicle. As is known, the crankshaft undergoes cycles of accelerations and decelerations associated with the firing of the cylinders in the engine. The isolator permits these accelerations and decelerations to occur with reduced effect on the speed of the belt. A problem with some isolators is noise that is perceivable by a vehicle occupant, which can negatively affect the occupant's perception of quality of the vehicle. Another problem relates to the effort to seal the interiors of isolators to inhibit the migration of dirt and other contaminants into the interior. It would beneficial to provide an isolator that at least partially addressed one or more of these problems.

SUMMARY

In an aspect, an isolator is provided, comprising a hub, a pulley, an isolation spring and a transition spring. The hub defines an axis and is connectable to a rotatable shaft of a rotary device. The pulley is rotatably mounted to the hub. The isolation spring and transition spring act in series in a torque path between the pulley and the hub. The isolation spring has a first spring rate. The transition spring has a second spring rate that is lower than the first spring rate.

In another aspect, an isolator is provided, comprising a hub, a pulley, an isolation spring and a transition spring. The hub defines an axis and is connectable to a rotatable shaft of a rotary device. The pulley is rotatably mounted to the hub. The isolation spring and transition spring act in series in a torque path between the pulley and the hub. The isolation spring has a first spring rate. The transition spring has a second spring rate. Throughout a first range of relative movement between the hub and the pulley away from a home position, the effective spring rate of the isolator is the series sum of the first and second spring rates, and throughout a second range of relative movement beyond the first range of relative movement between the hub and the pulley away from the home position, the effective spring rate of the isolator is the first spring rate.

In yet another aspect, an isolator is provided, comprising a hub, a pulley, an isolation spring and a transition spring. The hub defines an axis and is connectable to a rotatable shaft of a rotary device. The pulley is rotatably mounted to the hub. The isolation spring that acts in a torque path between the pulley and the hub. A seal member is provided having a first lip engaged with the pulley and a second lip engaged with the hub. The first and second lips face an interior chamber of the isolator and are urged against the pulley and the hub respectively by pressure in the interior chamber during operation of the isolator.

BRIEF DESCRIPTION OF THE DRAWINGS

The foregoing and other aspects of the disclosure will be more readily appreciated by reference to the accompanying drawings, wherein.

DETAILED DESCRIPTION OF EMBODIMENTS

Figure 1:
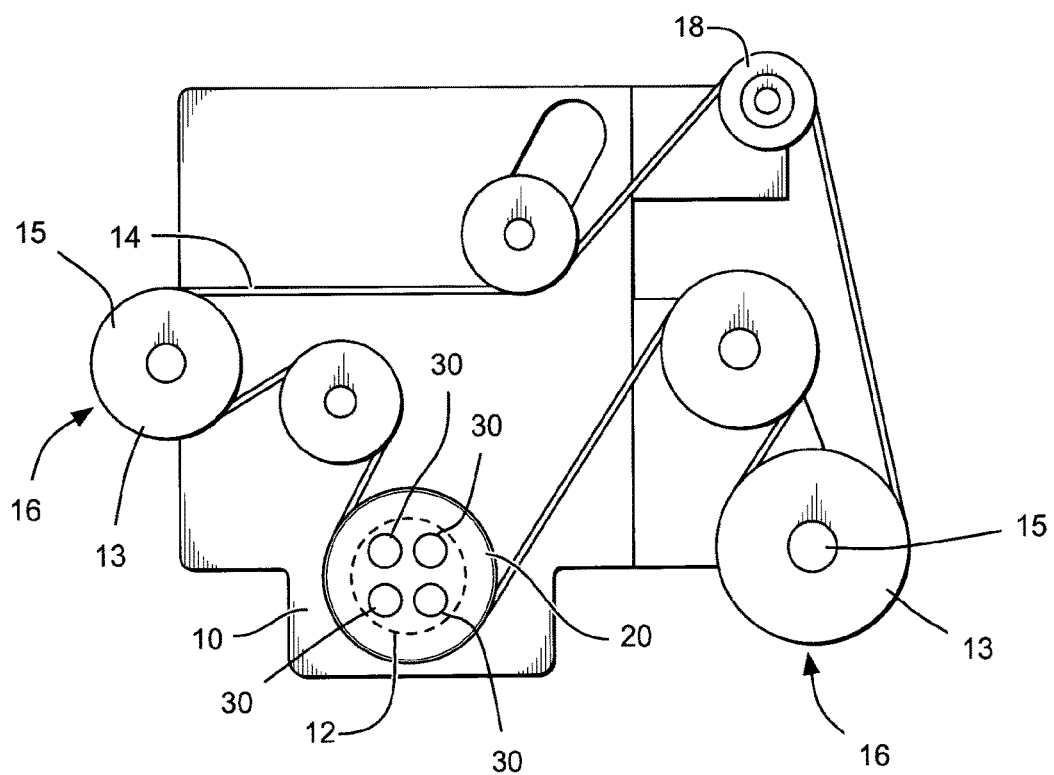
FIG. 1 is an elevation view of an engine with a belt drive with an isolator in accordance with an embodiment of the present invention.

Reference is made to FIG. 1, which shows an engine 10 for a vehicle. The engine 10 includes a crankshaft 12 which drives an endless drive member 14, which may be referred to as a belt 14 for convenience, with the understanding that any other suitable endless drive member could instead be used. Via the belt 14, the engine 10 drives a plurality of accessories 16 (shown in dashed outlines), such as an MGU (motor-generator unit) 18. Each accessory 16 includes an input drive shaft 15 with a pulley 13 thereon, which is driven by the belt 14. An isolator 20 is provided between the crankshaft 12 and the endless drive member 14.

Figure 2:
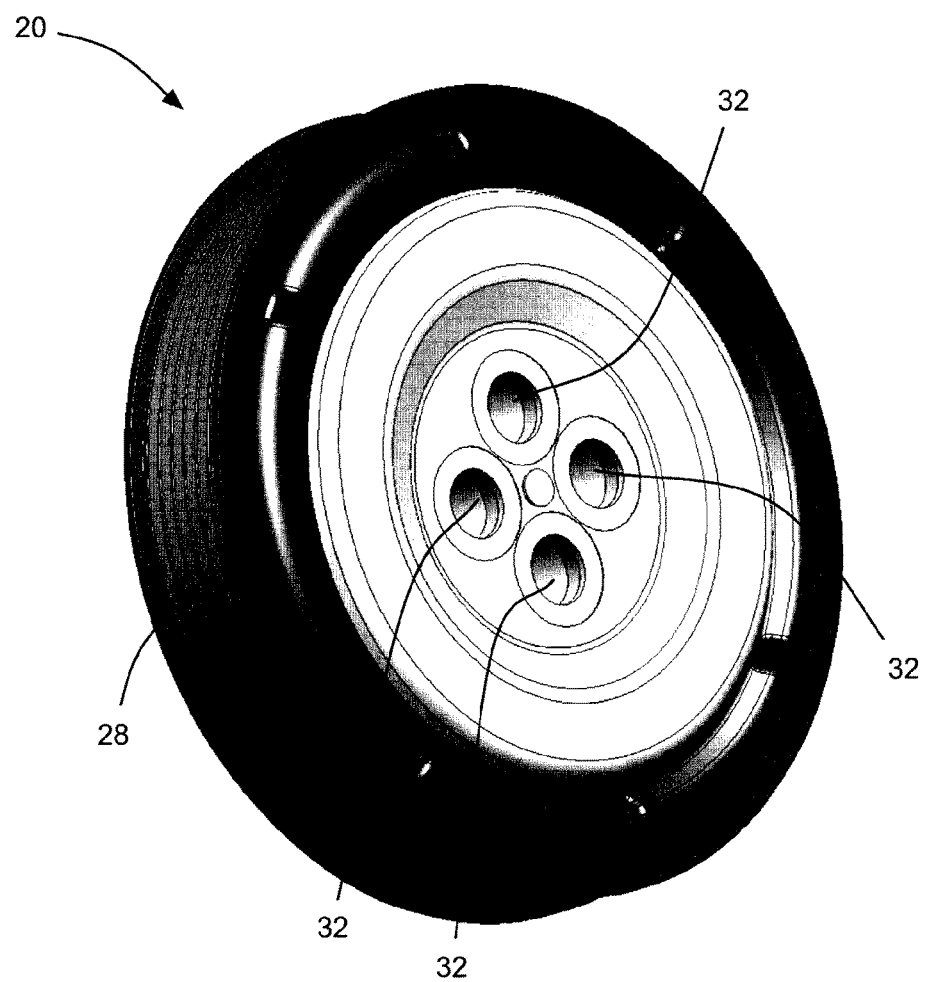
FIG. 2 is a magnified perspective view of the isolator shown in FIG. 1.
Figure 3:
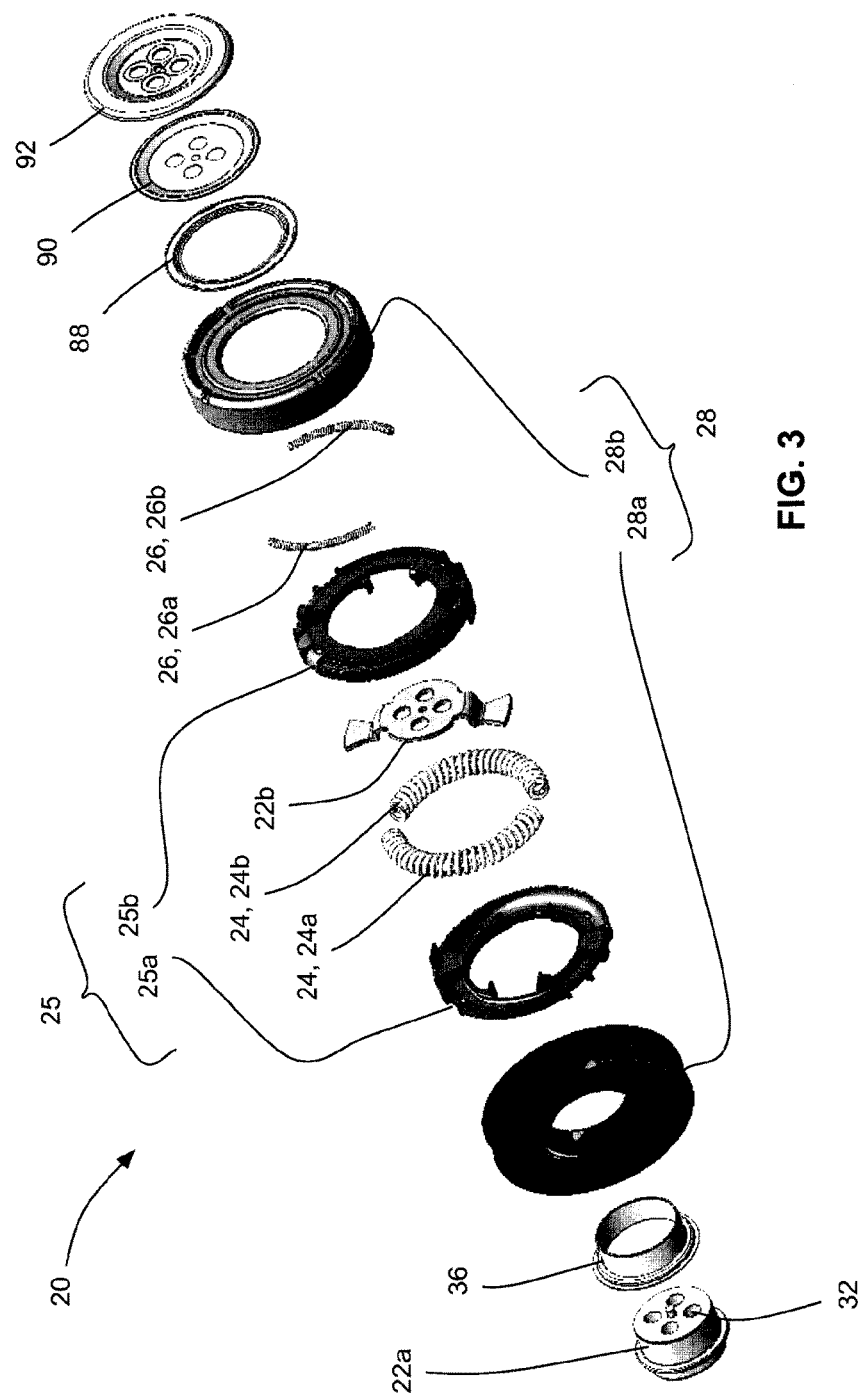
FIG. 3 is an exploded perspective view of the isolator shown in FIG. 1.
Figure 4:
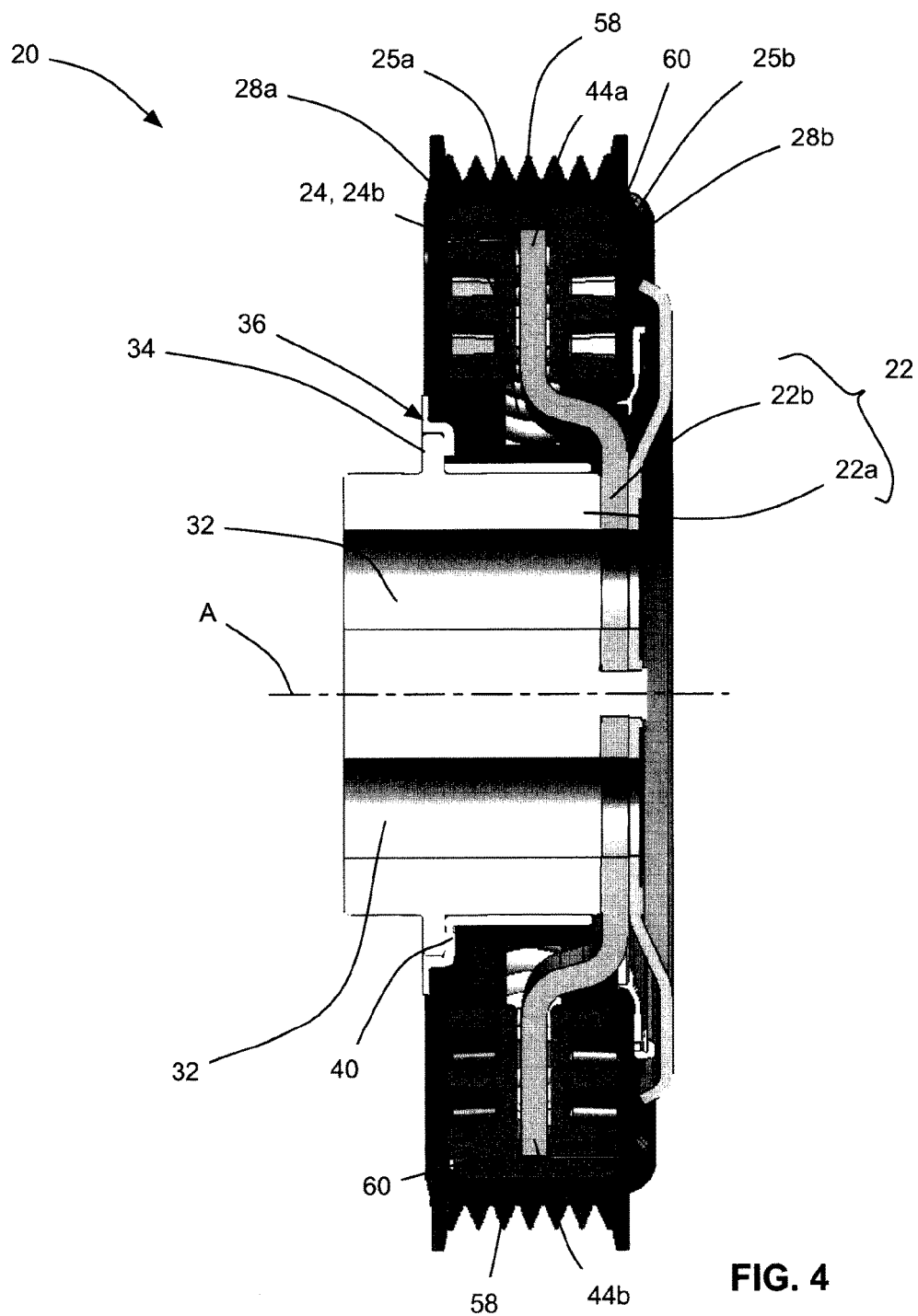
FIG. 4 is a sectional elevation view of the isolator shown in FIG. 1.

The isolator 20 is shown in an enlarged perspective view in FIG. 2, in a perspective exploded view in FIG. 3, and in a sectional elevation view in FIG. 4. As seen in FIGS. 2-4, the isolator 20 includes a hub 22, first and second isolation springs 24 (shown individually at 24*a* and 24*b*), a intermediate member 25, first and second transition springs 26 (shown individually at 26*a* and 26*b*), and an isolator pulley 28.

The hub 22 may be adapted to mount to the crankshaft 15 (FIG. 1) in any suitable way. For example, the hub 22 may include a shaft adapter 22*a* and a driver 22*b*. The shaft adapter 22*a* may mount to the crankshaft 12 (FIG. 1) in any suitable way, such via a plurality of threaded fasteners (shown at 30 in FIG. 1) such as four spline socket head cap screws that pass through apertures 32 (FIG. 4) in the shaft adapter 22*a* and into threaded apertures (not shown) in the end of the crankshaft 12 (FIG. 1). The hub 22 defines an isolator axis A (FIG. 4) and is rotatable about the isolator axis A.

The shaft adapter 22*a* may include a support surface 34 for supporting a bushing 36 that in turn supports a bushing engagement surface 38 on the pulley 18 so as to permit relative rotation between the pulley 18 and the crankshaft 12, the shaft adapter 22*a* and the driver 20. The bushing 36 may also include a radial lip 40 that acts as a thrust bushing portion that is engaged by and supports the pulley 18 in the axial direction. The bushing 36 may be made from any suitable material such as nylon, PTFE, or any other suitable material. The material of construction of the bushing 36 affects the frictional qualities of the bushing 36. Some torque will be transferred direction between the hub 22 and the pulley 28 frictionally through the bushing 36 during relative rotation between the hub 22 and pulley 28. By selecting the material and other properties this frictional torque transfer can be relatively small or can be larger, as desired based on the application. The frictional force produced at the bushing 36 can be selected to provide a selected amount of damping to the movement of the hub 22 and pulley 28 relative to one another, so as to inhibit resonance from occurring at the springs 24 and the springs 26.

The fasteners 30 (FIG. 1) also pass through apertures in the driver 22*b* (FIG. 4) thereby fixing the driver 22*b* to the shaft adapter 22*a* and to the crankshaft 12 (FIG. 1). The driver 22*b* has a central body 42, a first arm 44*a* and a second arm 44*b*. The driver 22*b* has a first isolation spring engagement surface 46 on a first side 48 of each of the first and second arms 44*a* and 44*b*. The first isolation spring engagement surfaces 46 are engageable with first spring ends 50 of the isolation springs 24 so as to transfer torque therebetween. The driver 22*b* has a second isolation spring engagement surface 52 on a second side 54 of each of the first and second arms 44*a* and 44*b*. The second isolation spring engagement surfaces 52 are engageable with second spring ends 56 of the isolation springs 24. The driver 20 may be made from any suitable material such as a suitable metal, such as steel.

The isolation springs 24 elastically deform to isolate the endless drive member 14 and the crankshaft 12 from vibrations or other sudden changes in torque in one another. In the specific embodiment shown, the isolation springs 24 transfer force between the hub 24 and the intermediate member 25.

The springs 24 in the examples shown are arcuate, helical coil compression springs made from any suitable material such as spring steel. However, any other suitable type of springs could be used, such as, for example, closed cell foam or PTU springs. The springs 24 operate in parallel, and have a first spring rate which may be, for example, about 3.5 to about 4.5 Nm/degree combined (i.e. about 1.75 to about 2.25 Nm/degree each). It will be noted that these values are examples only. The first spring rate could be, for example, between about 3 and about 5 Nm/degree, or could be any other suitable value.

Figure 8:
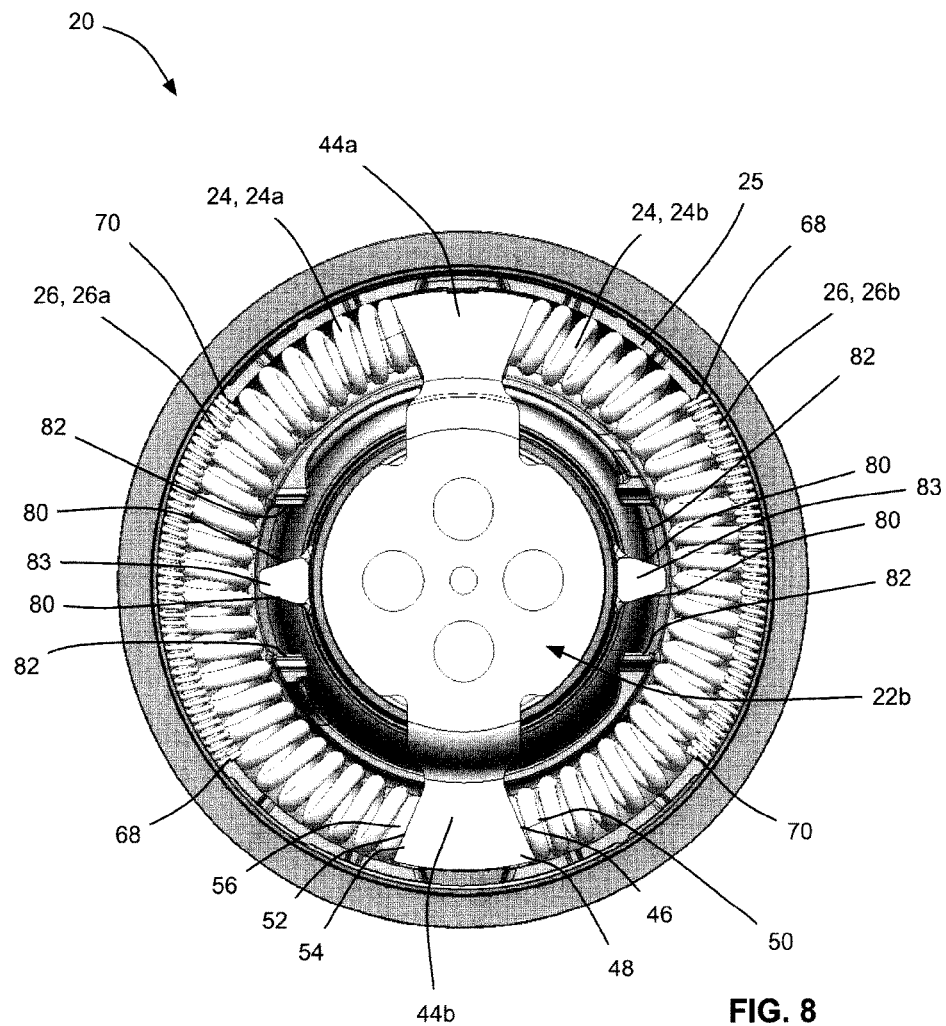
FIG. 8 is a front elevation view of the isolator shown in FIG. 2 with some components removed to reveal components inside the isolator, in a home position.

The springs 24 may have a selected amount of travel or compression available to them, such as more than about +/−25 degrees from the home or neutral position shown in FIG. 8.

The intermediate member 25 (FIGS. 2, 4, 5 and 6) transfers force between the isolation springs 24 and the transition springs 26. In the example embodiment shown, the intermediate member 25 is a spring shell that is positioned in surrounding relationship with the isolation springs 24 (i.e. that at least partially encloses the isolation springs 24) and prevents metal-to-metal contact between the isolation springs 24 and the pulley 28 in embodiments wherein the isolation springs 24 and pulley 28 are both metallic.

Referring to FIG. 4, the intermediate member 25 may be made from two force transfer member portions 25*a* and 25*b*, which may be assembled together by any suitable means, such as by a clip member 58 on each force transfer member portion and a clip receiving shoulder 60 on each force transfer member portion 25*a* and 25*b*, that receives the clip member 58 from the other force transfer member portion 25*a* and 25*b*.

The intermediate member 25 may be slidable relative to the pulley 28. The intermediate member 25 has first and second isolation spring engagement surfaces 60 and 62 thereon (shown best in FIG. 6) that engage the ends 50 and 56 of the isolation springs 24. As can be seen the isolation spring engagement surfaces 60 and 62 are positioned on a pair of lugs 64 formed as part of each force transfer member portion 25*a* and 25*b*. The lugs 64 on the force transfer member portions 25*a* and 25*b* sandwich the driver arms 44*a* and 44*b*, although there is preferably little or no contact therebetween so that relative movement between the driver arms 44*a* and 44*b* and the lugs 64 is facilitated.

Figure 7:
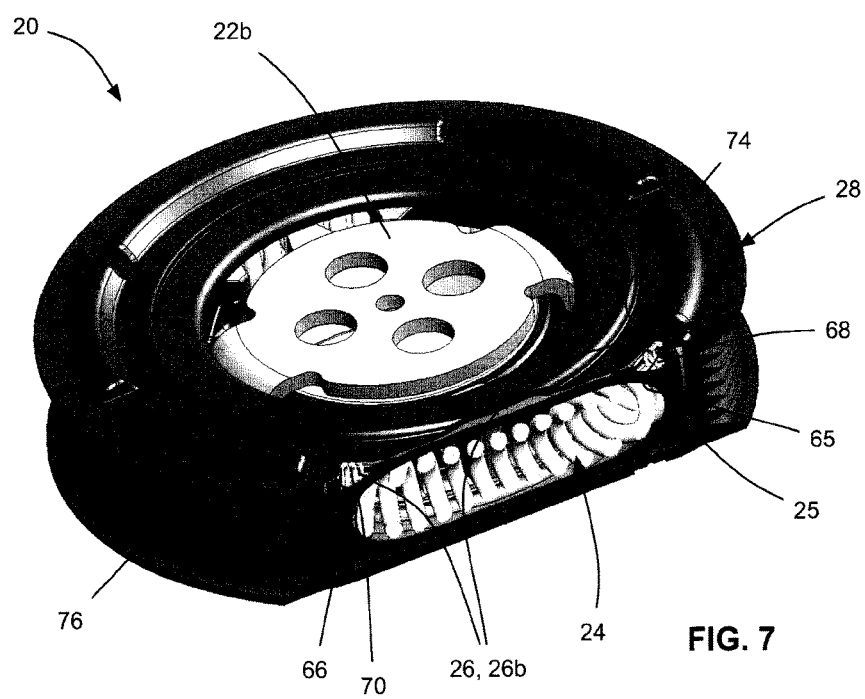
FIG. 7 sectional perspective view of the isolator shown in FIG. 2 to show engagement between transition springs and a pulley and an intermediate member.

The intermediate member 25 further includes first and second transition spring engagement surfaces 65 and 66 as shown in FIG. 7. These surfaces 65 and 66 engage first and second ends 68 and 70 of the transition springs 26*a* and 26*b*. These surfaces may be on an exterior surface of the intermediate member 25, whereas the isolation spring engagement surfaces 60 and 62 are on an interior surface of the force transfer 25 that encloses an interior volume in which the isolation springs 24 reside.

The first and second transition springs 26 have a second spring rate that is lower than the first spring rate of the isolation springs, and act in series with the isolation springs 24 during torque transfer through the isolator 20. The transition springs 26 operate in parallel and preferably have a relatively low spring rate (e.g. less than about 0.5 Nm/degree in total, which corresponds to about 0.25 Nm/degree each). A combined spring rate of less than about 1 Nm/degree may be acceptable. The springs 26 in the examples shown are arcuate, helical coil compression springs made from any suitable material such as spring steel. However, any other suitable type of springs could be used, such as, for example, closed cell foam or TPU springs. The springs 26 are positioned to transfer force generally the hub 22 and the pulley 28 and act in series with the springs 24. In the embodiment shown the springs 26 transfer force specifically between the intermediate member 25 and the pulley 28, while the springs 24 transfer force specifically between the hub 22 and the intermediate member 25, as noted above.

The transition springs 26 may have a selected amount of travel or compression available to them, such as +/− more than 20 degrees from the home, or neutral position shown in FIG. 8.

The pulley 28 is supported for rotation relative to the crankshaft 12 via the bushing 36 and is engageable with the belt 14. It will be noted that the term 'belt' is used for convenience, but instead it may be any suitable endless drive member. Analogously, the term 'pulley' is used for convenience, but instead it may be any suitable rotary member that is engageable with the endless drive member.

The pulley 28, in the embodiment shown has a belt engagement surface 72 that is configured to engage a poly-V groove belt. The pulley 28 may be made from two elements including a main portion 28a and a cover member 28b that is connected to the main portion 28a via any suitable means (e.g. by means of a press-fit). The pulley 28 may be made from any suitable material such as a suitable metal, such as steel.

The pulley 28 has first and second transition spring engagement surfaces 74 and 76 (FIG. 7) which engage the first and second ends 68 and 70 of the transition springs 26 to permit force transfer therebetween.

Both the isolation springs 24 and the transition springs 26 may be preloaded so that they are compressed by some selected amount even when the isolator 20 is itself not under load.

Figure 5:
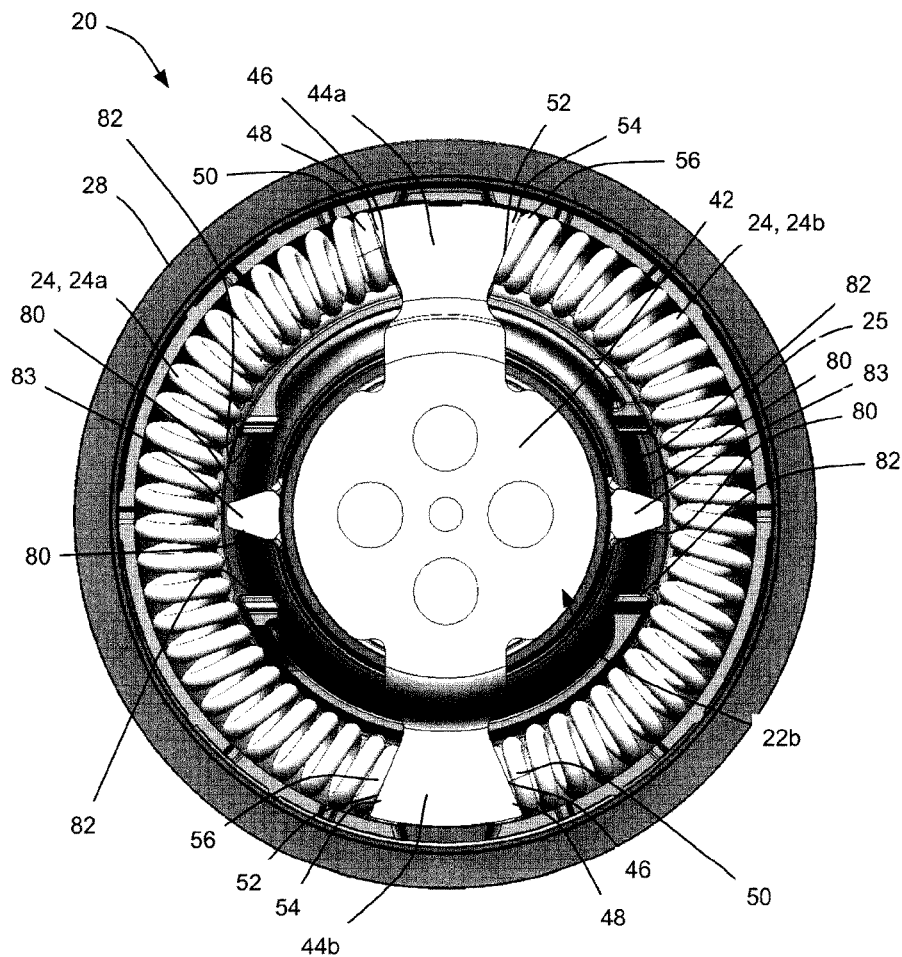
FIG. 5 is a front elevation view of the isolator shown in FIG. 2 with some components removed to reveal components inside the isolator.
Figure 6:
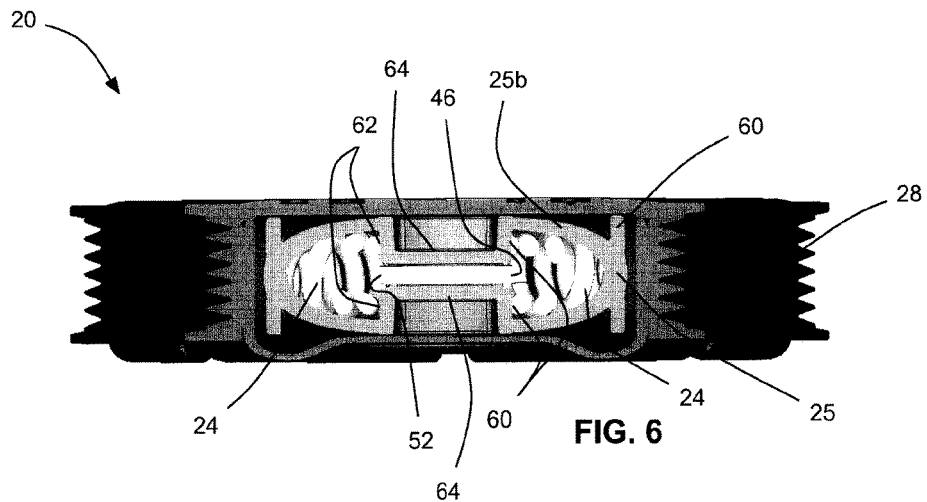
FIG. 6 is another sectional elevation view of the isolator shown in FIG. 2 to show engagement between isolation springs and a driver and an intermediate member.

As shown in FIG. 5, the pulley 28 has optional first transition spring torque limit surfaces 80 thereon that are engageable with second transition spring torque limit surfaces 82 on the intermediate member 25 when the relative movement between the pulley and the intermediate member 25 reaches a selected angle, such as, for example, 20 degrees to limit compression of the transition springs 26. In the embodiment shown, the limit surfaces 80 are provided on two projections 83 on an inner portion of the pulley 28, and the limit surfaces 82 are provided on projections that form part of the intermediate member 25.

Figure 12:
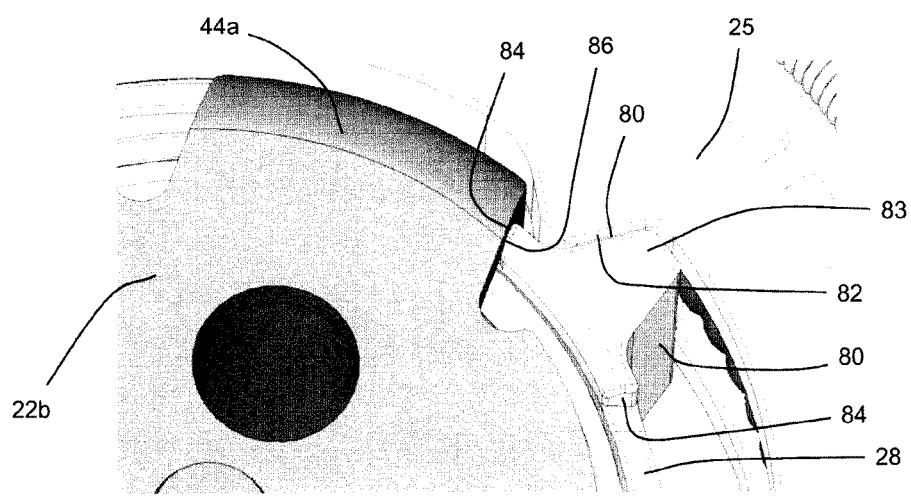
FIG. 12 is a front elevation view of a variant of the isolator shown in FIG. 2 with some components removed to reveal components inside the isolator, illustrating a position at which a second selected amount of torque is being transferred between the hub and the pulley.

As shown in FIG. 12, the pulley 28 may be configured to have optional first isolation spring torque limit surfaces 84 thereon that are engageable with second isolation spring torque limit surfaces 86 on the hub 22 when the relative movement between the pulley 28 and the hub 22 reaches a selected angle, such as, for example, 55 degrees to limit compression of the isolation springs 24. In the embodiment shown the limit surfaces 84 are provided on the projections 83 on the inner portion of the pulley 28, and the limit surfaces 86 are provided at the bases of the driver arms 44a and 44b. Engagement of the limit surfaces 84 and 86 provides a solid connection between the hub 22 and the pulley 28 thereby bypassing both the isolation and transition springs 24 and 26. It will be noted that the limit surfaces 84 and 86 could be configured to be positioned differently than they are in the configuration shown in the figures. For example, the limit surfaces 86 could be on the projections on the intermediate member 25 instead of being on the pulley 28.

Figure 9:
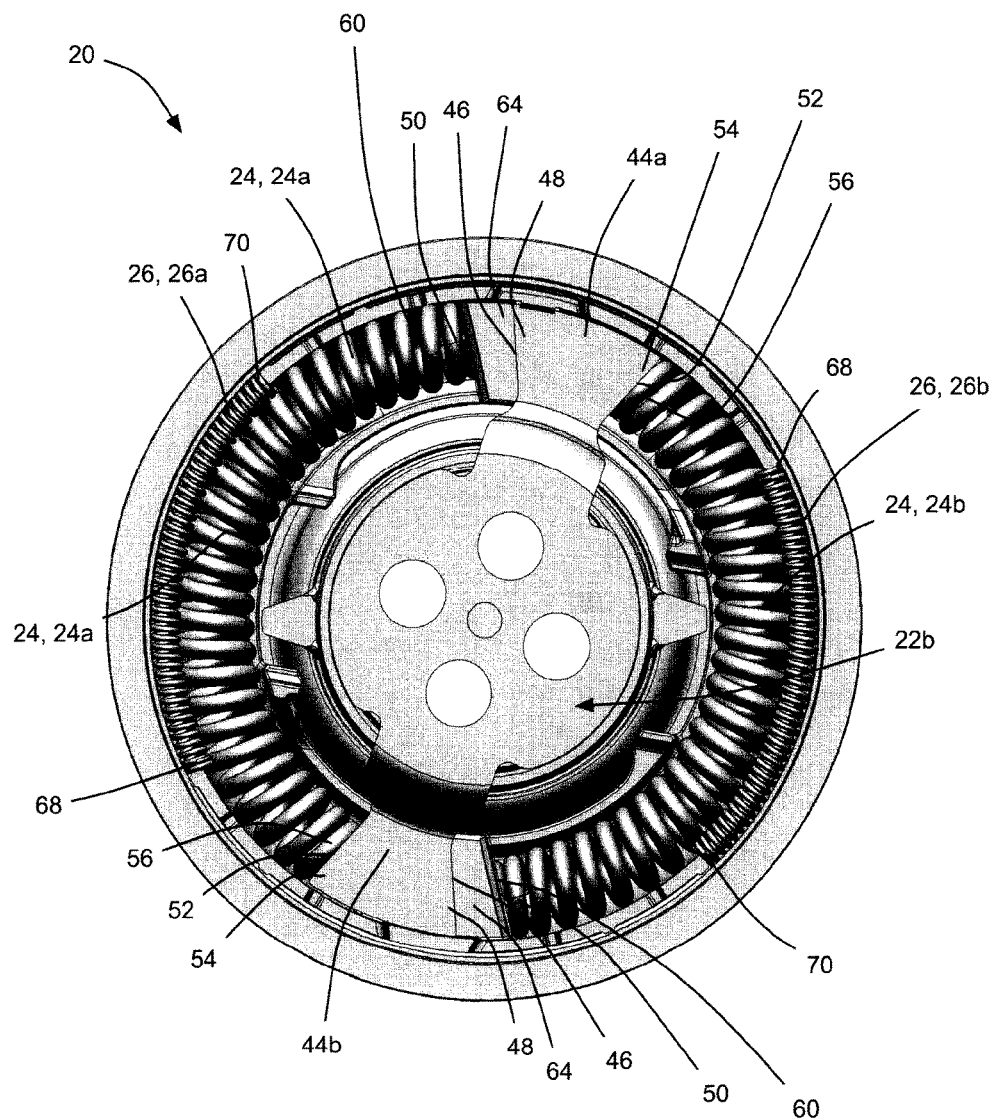
FIG. 9 is a front elevation view of the isolator shown in FIG. 2 with some components removed to reveal components inside the isolator, illustrating a position within a first range of relative movement between a hub and a pulley of the isolator.

Reference is made to FIG. 8. At no load, the driver arms 44a and 44b are aligned angularly with the lugs 64 on the intermediate member 25. The springs 24 and 26 are in a lowest state of compression in this position. When a load is applied to the engine 10 (e.g. when, during operation of the engine 10, the MGU 18 is energized in order to charge the vehicle's battery (not shown)), the crankshaft 12 will initially rotate relative to the pulley 28. Both sets of springs 24 and 26 will compress, however, the transition springs 26 will compress more, due to their softer spring rate relative to the isolation springs 24, as illustrated in FIG. 9. During this phase, the crankshaft 12 will rotate by some small amount relative to the intermediate member 25, due to the relatively higher spring rate of the isolation springs 24, and the intermediate member 25 will rotate by a larger amount relative to the pulley 28 due to the relatively softer spring rate of the transition springs 26. The torque limit surfaces 80 and 82 are brought towards each other during this phase.

Put another way, throughout a first range of relative movement between the hub 22 and the pulley 28 away from the home position shown in FIG. 8, the effective spring rate of the isolator 20 is the series sum of the first and second spring rates.

Figure 10:
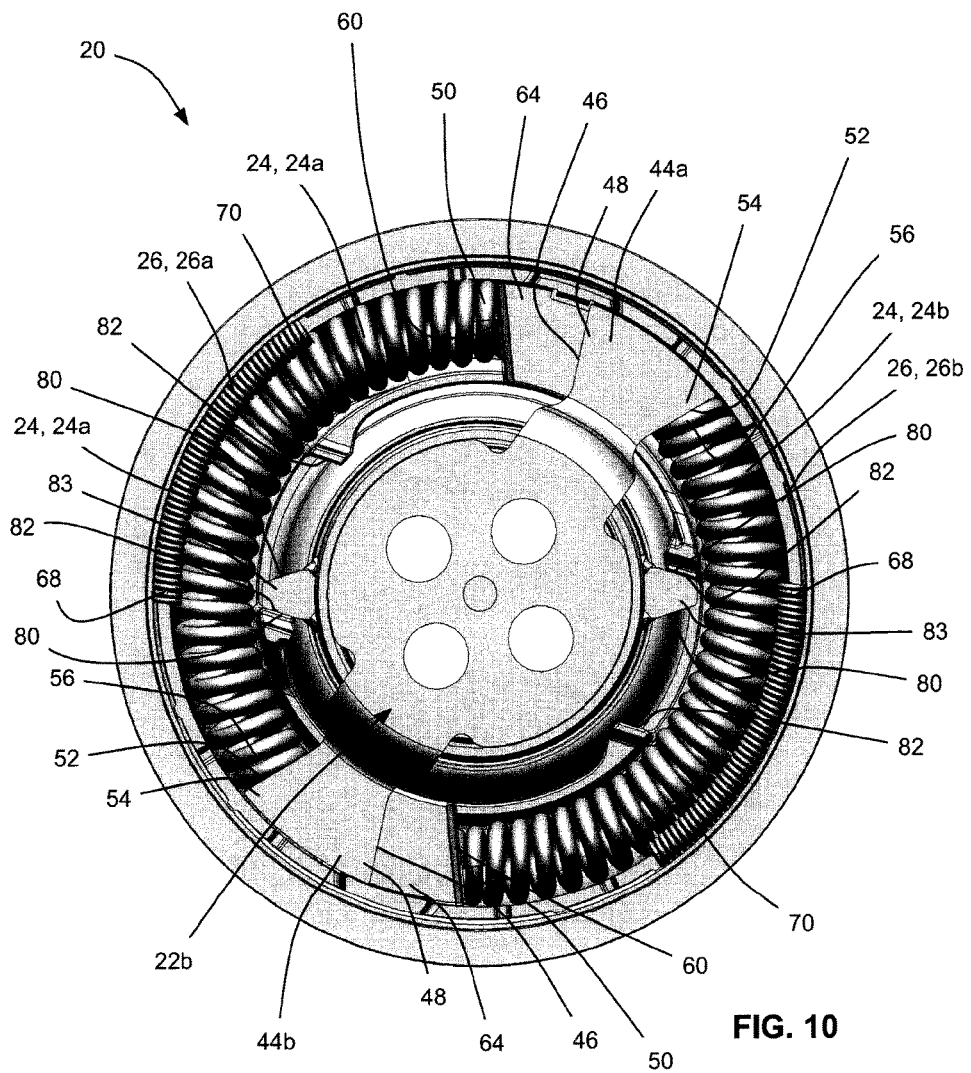
FIG. 10 is a front elevation view of the isolator shown in FIG. 2 with some components removed to reveal components inside the isolator, illustrating a position at which a first selected amount of torque is being transferred between the hub and the pulley.
Figure 11:
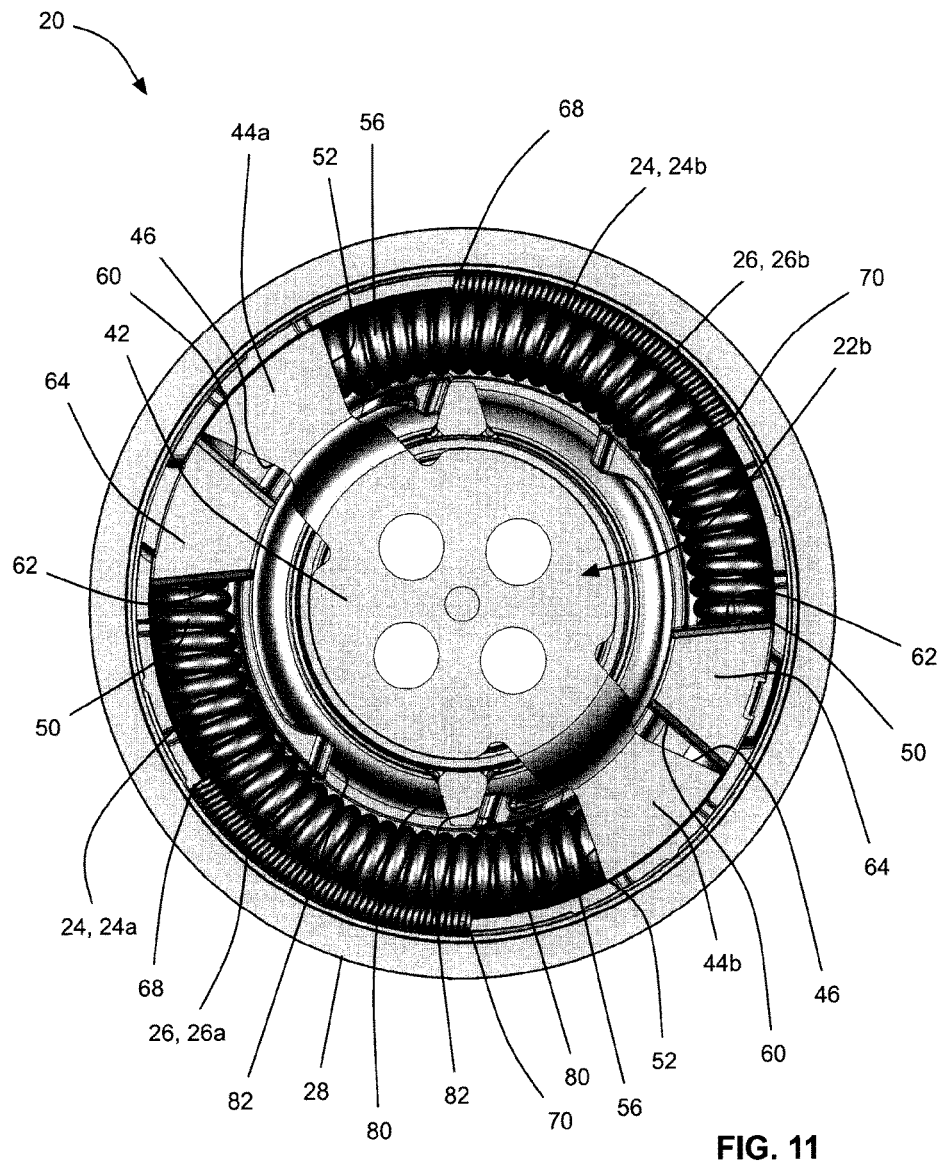
FIG. 11 is a front elevation view of the isolator shown in FIG. 2 with some components removed to reveal components inside the isolator, illustrating a position within a second range of relative movement between the hub and the pulley, which is beyond the first range of relative movement.

Once a first selected amount of torque transfer is reached, a certain amount of relative angular movement takes place between the intermediate member 25 and the pulley 28, at which point the torque limit surfaces 80 and 82 engage each other, thereby providing a solid connection between the intermediate member 25 and the pulley 28. This event is illustrated in FIG. 10. Up to this point, torque transferred between the intermediate member 25 and the pulley 28 takes place essentially solely through the transition springs 26 (aside from any torque that is transferred frictionally through the bushing 36). If the torque to be transferred increases beyond the first selected amount, the excess torque is transferred through the engagement of the surfaces 80 and 82. In other words, the selected amount of torque continues to be transferred through the transition springs 26, and the excess torque beyond the selected amount of torque is transferred through the engagement of the surfaces 80 and 82. It will be noted that torque transfer beyond the selected amount does not result in any further relative movement between the intermediate member 25 and the pulley 28 beyond the relative movement that brought the surfaces 80 and 82 together, thereby preventing any further compression of the transition springs 26. This can help to prevent damage to the transition springs 26 during periods of high torque transfer. The selected amount of torque that gives rise to engagement of the limit surfaces 80 and 82 may be referred to as the maximum permissible transition torque.

In other words, throughout a second range of relative movement beyond the first range of relative movement between the hub 22 and the pulley 28 away from the home position, the effective spring rate of the isolator 20 is the first spring rate.

Once a second selected amount of torque (which is higher than the first selected amount of torque described above) is transferred through the isolator 20, a certain amount of relative angular movement takes place between the hub 22 and the intermediate member 25 and also, in this embodiment, between the hub 22 and the pulley 28, at which point the isolation spring torque limit surfaces 84 and 86 engage each other, thereby providing a solid connection between the hub 22 and the pulley 28, (or, in an alternative embodiment, between the hub 22 and the intermediate member 25). This event is illustrated in FIG. 12. Up to this point, torque transferred between the hub 22 and the pulley 28 takes place essentially solely through the transition springs 26 (aside from any torque that is transferred frictionally through the bushing 36). If the torque to be transferred increases beyond the second selected amount, the excess torque beyond the second selected amount takes place through the engagement of the surfaces 84 and 86 (while the rest of the torque is transferred through the isolation springs 24, and through the bushing friction). The second selected amount of torque may be selected to protect the isolation springs 24 from damage, or for any other suitable reason.

It will be noted that, during some events, such as, for example, an event where the MGU 18 drives the belt 14 in order to boost power or to start the engine 10, torque is transferred from the belt 14 to the pulley 28, from the pulley 28 to the transition springs 26, from the springs 26 to the intermediate member 25, from the intermediate member 25 to the hub 22 (via the driver 22*b*). When the amount of torque transferred exceeds the maximum permissible transition torque noted above, the limit surfaces 80 and 82 engage one another and any excess torque beyond the maximum permissible transition torque is carried through engagement of the surfaces 80 and 82. In other words all of the torque transferred from the pulley 20 to the intermediate member 25 is transferred through the transition springs 26 until the torque exceeds a selected torque, at which point excess torque beyond the selected torque is transferred through the engagement of the limit surfaces 80 and 82. All of the torque that is transferred from the intermediate member 25 to the hub 22 is transferred through the isolation springs 24. As noted above in the description of torque transfer from the hub 22 to the pulley 28, there is some amount of torque that is frictionally transferred through the bushing 36.

Figure 14:
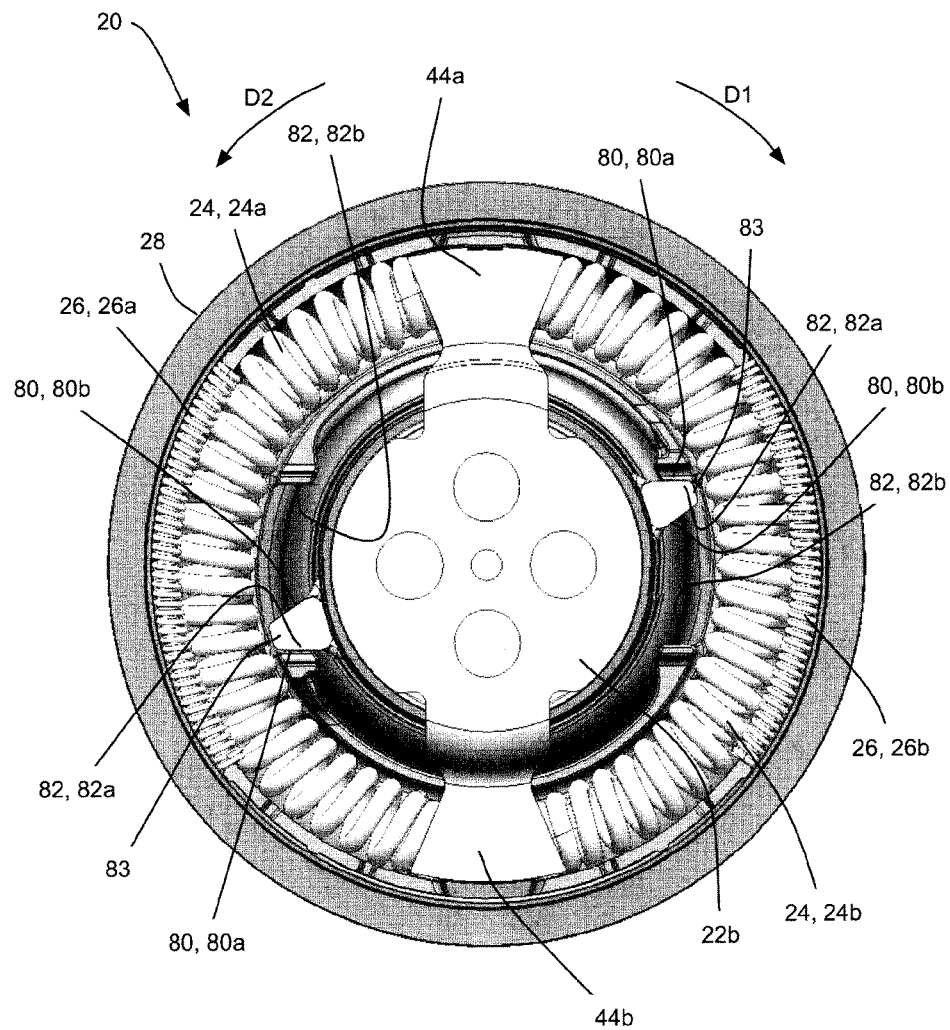
FIG. 14 is a front elevation view of a variant of the isolator shown in FIG. 2 with some components removed.

During operation of the vehicle the engine will be started by the starter motor (not shown), which may be referred to as a key start, and will be started by the MGU 18 (referred to as a BAS start) after temporary shutdowns during short stops (e.g. waiting at stop lights) during a driving event. During a key start, there are a number of components underhood that are moving and generating noise, and so any noise that would result from engagement of the torque limit surfaces 80 and 82 would be masked by these other components. However, during a BAS start, there is typically significantly less noise underhood and so the noise of the engagement of the torque limit surfaces 80 and 82 may become more noticeable to the driver of the vehicle. To mitigate the occurrence of noise during a BAS start, the home position for the hub 22, the intermediate member 25 and the pulley 28 may be as shown in FIG. 14. As shown, the projections with the torque limit surfaces shown at 82*a* are positioned closer to the lugs 64 on the pulley 28 (and therefore closer to the torque limit surfaces shown at 80*a*), than are the torque limit surfaces shown at 82*b* to the torque limit surfaces shown at 80*b*. As a result, during a BAS start event, when the pulley 28 is driven by the belt 14 (FIG. 1), there will be a relatively smaller amount of acceleration of the pulley 28 prior to engagement of the limit surfaces 80*a* and 82*a* than would occur in the embodiment shown in FIG. 8, which will reduce any noise that results during impact between the surfaces 80*a* and 82*a*. By contrast, during a key start event, there is a relatively longer amount of travel that occurs before the limit surface 80*b* contacts the limit surface 82*b* as compared to the embodiment shown in FIG. 8. As a result, there may be increased acceleration of the hub 22 prior to impact as compared to the hub 22 in the embodiment shown in FIG. 8. However, since the impact noise is generally masked by the movement of other underhood components during tests it has been found to be not noticeable to the driver of the vehicle.

Put another way, the first and second transition spring torque limit surfaces 80 and 82 may be positioned to engage one another after a first amount of movement of the transition springs 26 during torque transfer in a first rotational direction (shown in FIG. 14 at D1) between the hub 22 and pulley 28, and the first and second transition spring torque limit surfaces 80 and 82 may be positioned to engage one another after a second amount of movement of the transition spring this is smaller than the first amount of movement, during torque transfer in a second rotational direction (shown in FIG. 14 at D2) between the hub 22 and pulley 28. In the example shown in FIG. 14, the second amount of movement is approximately zero degrees.

Figure 13:
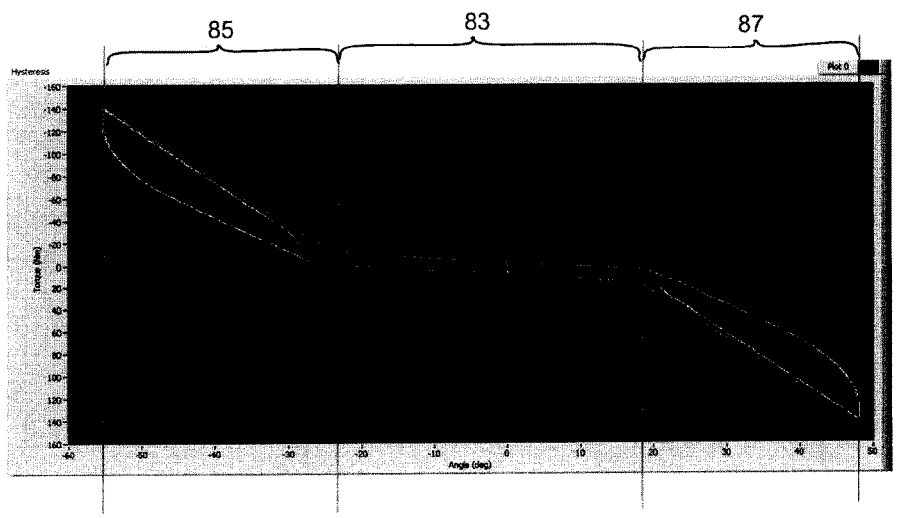
FIG. 13 is a graph illustrating the relationship between torque transfer and position of the isolator.

The torque/position curve for the isolator 20 is shown in FIG. 13. The region of the graph shown at 83 is the region in which the both the transition springs 26 and the isolation springs 24 are progressively compressed, resulting in an effective spring rate that is the series sum of the first and second spring rates. The regions shown at 85 and 87 are the regions in which only the isolation spring continues to compress, while the torque limit surfaces 80 and 82 are engaged preventing further compression of the transition springs 26, giving the isolator 20 an effective spring rate that is the first spring rate. As can be seen, because of the presence of the transition springs 26, there is essentially no dead zone (i.e. no region where there is free play between the hub 22 and the pulley 28) in the isolator 20. This can be observed in the graph by the absence of a portion that is horizontal and substantially zero. It has been found that, in prior art isolators, these regions of free play can result in accelerations of the components relative to one another, which can result in noise that can be perceived by the user of the vehicle, which can negatively impact the perception of quality of the vehicle. It has further been found, however, that, by providing the transition springs 26 with their associated, small but non-zero, spring rate and their relatively large amounts of available travel there is a smooth transition when the load direction changes (e.g. when torque transfer from the hub 22 to the pulley 28 transitions to torque transfer from the pulley 28 to the hub 22). Furthermore, the isolation springs 24 pass through their natural frequency during the transition from torque transfer in one direction (e.g. hub 22 to pulley 28) to the other direction (pulley 28 to hub 22). By providing the transition springs 26, the springs 26 can dissipate their stored energy while preventing resonance from occurring.

It will be noted that, in some embodiments, the transition springs 26 may have a spring rate that is the same spring rate as that of the isolation springs 24. In other words, it is possible in some embodiments for the second spring rate to be the same as the first spring rate. The overall effective spring rate for the isolator 20 would still be lower during the first range of movement between the hub 22 and the pulley 28, than it would if there were no transition springs. In other words, the overall effective spring rate of the transition springs 26 in series with the isolation springs 24 is lower than the spring rate of just the isolation springs. As a result, the spring rate for the isolator 20 when both the isolation springs 24 and the transition springs 26 are compressing together under load will be lower than the spring rate when the transition springs 26 reach their limit of compression due to engagement of the torque limit surfaces 80 and 82. Thus, the same shape of torque curve shown in FIG. 13 can be had generally when using isolation springs 24 and transition springs 26 that have the same spring rates.

Figure 15:
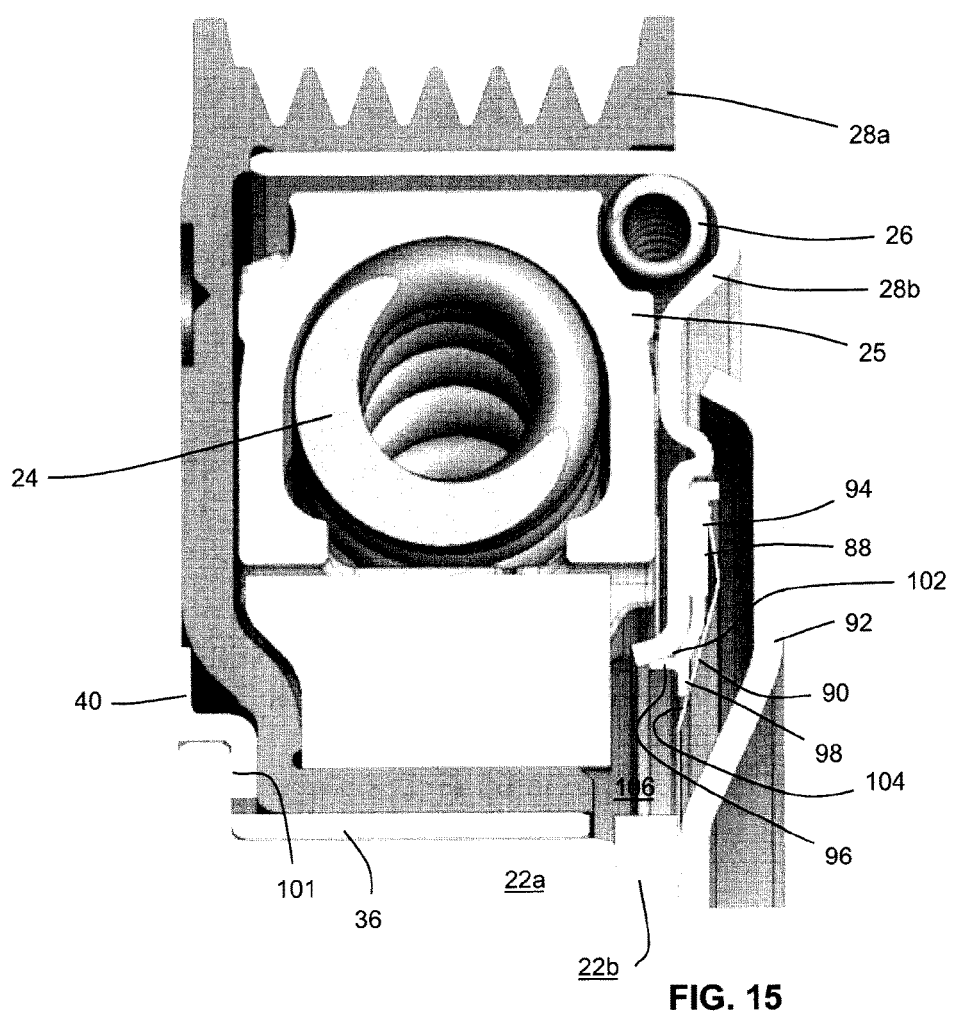
FIG. 15 is a sectional side view of a portion of the isolator shown in FIG. 2, illustrating a seal member.

Referring to FIGS. 3 and 15, the isolator 20 further includes a seal member 88, an axial assembly biasing member 90 and a dust shield 92. The seal member 88 has a base portion 94 and first and second seal lips 96 and 98. The base portion 94 may be mounted to rotate with the pulley 28.

For example, as shown in FIG. 14, the axial assembly biasing member 90 may be fixedly mounted to the hub 22 by means of the fasteners 32 (FIG. 1), and the axial assembly biasing member 90 may include an axial assembly biasing surface 100 that urges the pulley 28 and the bushing 36 against a reference surface 101 (i.e. a shoulder) on the hub 22. Friction between the seal member 88 and the cover member 28b may keep the seal member 88 rotationally locked to the pulley 28.

The first lip 96 may engage a first sealing surface 102 on the pulley 28, such as the cover member 28b. The second lip 98 may engage a second sealing surface associated with the hub 22, such as an inner surface 104 of the seal member biasing member 90 itself.

The first and second lips 96 and 98 may be arranged to face an interior chamber 106 of the isolator 20 in such a way that pressure from the interior chamber 106 that is generated during operation of the isolator 20 urges the lips 96 and 98 into engagement with the respective surfaces 102 and 104 so as to seal against the surfaces 102 and 104. The first and second lips 96 and 98 may also be arranged so as to be biased towards engagement with the surfaces 102 and 104 so as to provide some sealing effect therewith even when there is no pressure inside the chamber 106. By sealing the chamber 106, dirt and other contaminants are inhibited from migrating into the chamber 106. The dust shield 102, which is also connected to hub 22 by the fasteners 32 (FIG. 1), also inhibits migration of dust into the chamber 10.

While it is beneficial to provide the isolator 20 on the crankshaft 12 of the engine, it is alternatively possible to mount an embodiment of the isolator 20 on the shaft of the MGU 18. In some cases, there is no place for it on the crankshaft due to the need to provide other components on the crankshaft such as a torsional vibration damper pulley. In some embodiments it is contemplated that it may be less expensive to provide an isolator on the MGU 18 since the pulley and drive shaft for the MGU is inherently smaller than the pulley on the crankshaft 12 thereby permitting smaller components than would be permitted on the crankshaft 12.

Figure 16:
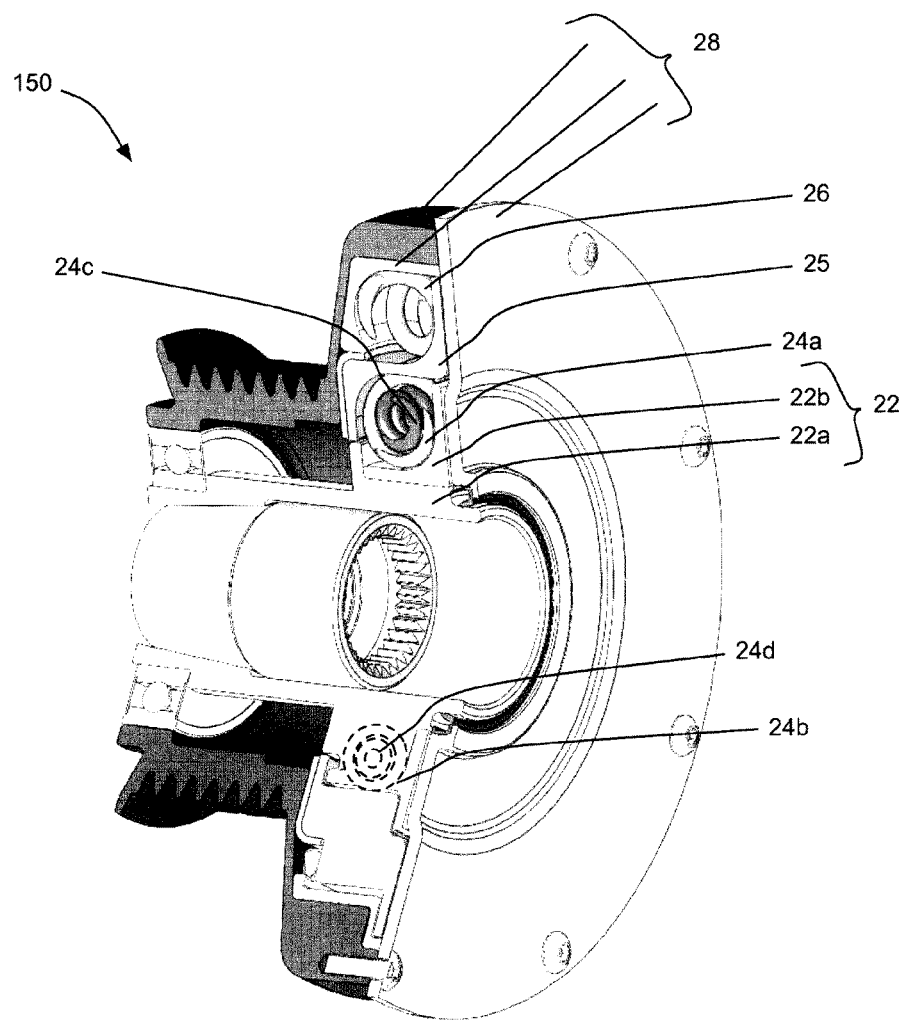
FIGS. 16-18 are cut out perspective views of alternative embodiments of isolators.
Figure 17:
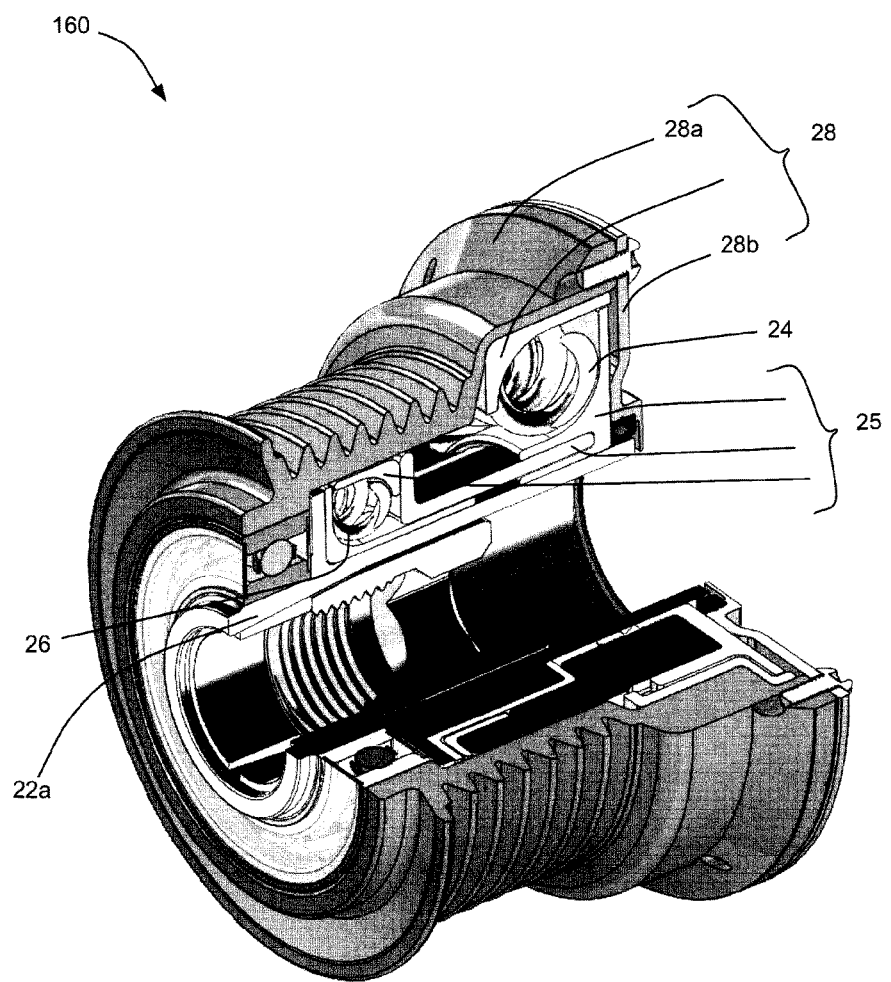
Figure 18:
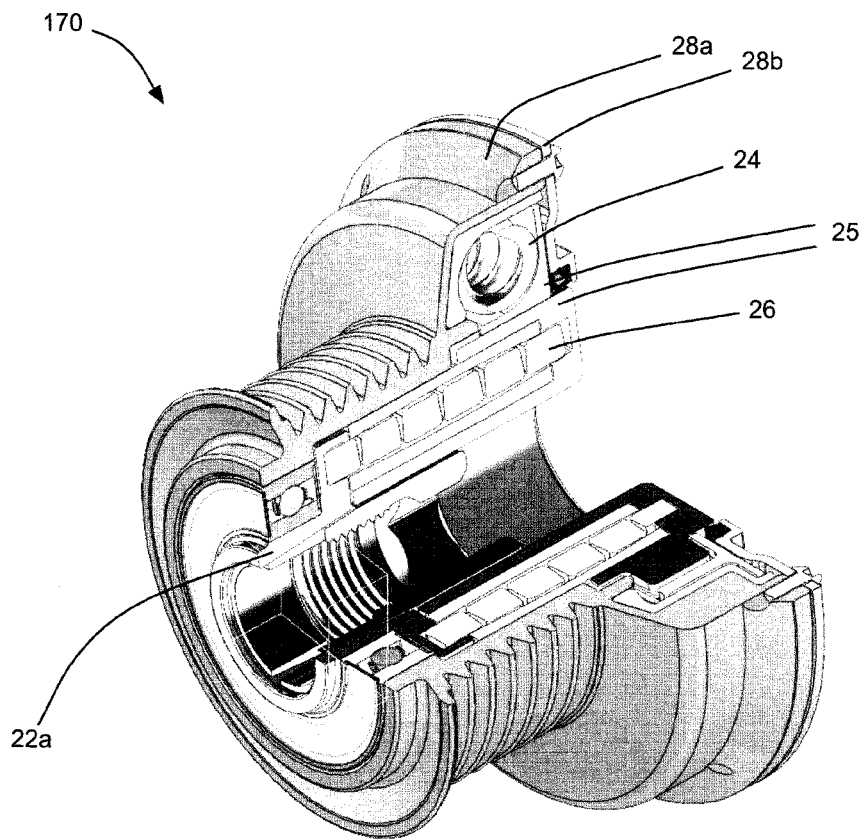

For example, referring to FIG. 16, an isolator 150 is provided, which may be similar to the isolator 20. The same reference numerals are used in FIG. 16 to denote elements with similar functions as those in FIGS. 2-14. A difference between the isolator 150 and the isolator 20 is that the there are four isolation springs 24 shown in FIG. 16, including outer springs 24a and 24b, and inner springs 24c and 24d which are nested within the outer springs 24a and 24b. The inner springs 24c and 24d may have a different length than the springs 24a and 24b and may thus only begin to be compressed after a selected amount of compression has taken place in the springs 24a and 24b. In this way, the effective spring rate for the isolator 150 may be further tailored so as to have a first spring rate during the range of movement where the outer isolation springs 24a and 24b act in series with the transition springs 26a and 26b, a second spring rate during the range of movement wherein the outer isolation springs 24a and 24b and the inner isolation springs 24c and 24d act in parallel with each other, and act in series with the transition springs 26a and 26b, and a third rate when the transition springs 26a and 26b are prevented from further compression. In the embodiment shown in FIG. 15, the transition springs 26 are directly radially outside the isolation springs 24. This provides a low axial length for the isolator 150. It will be noted that the isolator 20 (FIGS. 2-15) also has a low axial length (as well as a low radial dimension) due to the presence of the transition springs 26 in regions that are offset both axially and radially from the isolation springs 24. In the embodiment shown in FIG. 17, the transition springs 26 are provided in the region radially inside of the belt engagement surface of pulley 28, so as to reduce the overall radial dimension of the isolator (shown at 160) instead of being radially outside the isolation springs 24. In the embodiment shown in FIG. 18, the isolator shown at 170 has a transition spring 26 that is a single helical torsion spring provided radially inside of the belt engagement surface of the pulley 28, while the isolation springs 24 remain as arcuate helical compression springs.

While two isolation springs 24 have been shown, it is alternatively possible to provide more or fewer isolation springs 24. For example, it is possible that only one isolation spring 24 may be used in the isolator 20. Similarly, while two transition springs 26 have been shown, it is alternatively possible to provide a single transition spring 26 or three or more transition springs 26.

It has been shown for the isolation springs 24 to be provided between the hub 22 and the intermediate member 25 and for the transition springs 26 to be provided between the intermediate member 25 and the pulley 28. It is, however, alternatively possible to provide the transition springs 26 between the hub 22 and the intermediate member 25 and to provide isolation springs 24 between the intermediate member 25 and the pulley 28. In such an embodiment, torque limit surfaces may be provided on the hub 22 and the intermediate member 25 so as to limit the amount of compression that can be incurred by the transition springs 26.

Those skilled in the art will understand that a variety of modifications may be effected to the embodiments described herein without departing from the scope of the appended claims.

The invention claimed is:
1. An isolator, comprising:
a hub defining an axis;
a pulley that is rotatably mounted to the hub;
an isolation spring and a transition spring that act in series in a torque path between the pulley and the hub,
wherein the isolation spring has a first spring rate, and the transition spring has a second spring rate,
and wherein, throughout a first range of relative movement in a first rotational direction between the hub and the pulley away from a home position, the effective spring rate of the isolator is the series sum of the first and second spring rates, and throughout a second range of relative movement in the first rotational direction beyond the first range of relative movement between the hub and the pulley away from the home position, the effective spring rate of the isolator is the first spring rate;
and wherein, in a relative movement in a second, opposite, rotational direction between the hub and the pulley away from the home position the effective spring rate of the isolator is the first spring rate.

2. An isolator as claimed in claim 1, wherein the intermediate member at least partially encloses the isolation spring to prevent direct contact between the isolation spring and the pulley.

3. An isolator as claimed in claim 1, wherein the isolation spring is one of a plurality of isolation springs positioned in parallel with one another and the transition spring is one of a plurality of transition springs positioned in parallel with one another and in series with the isolation springs.

4. An isolator as claimed in claim 1, further comprising a first isolation spring torque limit surface and a second isolation spring torque limit surface, wherein the first and second isolation spring torque limit surfaces engage one another to limit compression of the isolation spring during movement of the hub and the pulley relative to one another.

5. An isolator as claimed in claim 1, wherein the first and second transition spring torque limit surfaces are positioned to engage one another after a first amount of movement of the transition spring during torque transfer in a first direction between the hub and pulley, and the first and second transition spring torque limit surfaces are positioned to engage one another after a second amount of movement of the transition spring this is smaller than the first amount of movement, during torque transfer in a second direction between the hub and pulley, wherein the second amount of movement includes zero movement.

6. An isolator as claimed in claim 1, further comprising a bushing having selected frictional properties positioned between the hub and the pulley.

7. An isolator as claimed in claim 1, wherein the second spring rate is less than about 1 Nm/degree, and the first spring rate is between about 3 and 5 Nm/degree.

8. An isolator as claimed in claim 1, wherein the transition spring is a circumferentially arranged helical torsion spring, and wherein the isolation spring is a circumferentially arranged helical torsion spring.

9. An isolator, comprising:
a hub defining an axis and connectable to a rotatable shaft of a rotary device;
a pulley that is rotatably mounted to the hub; and
an isolation spring and a transition spring that act in series in a torque path between the pulley and the hub,
wherein the isolation spring has a first spring rate, and the transition spring has a second spring rate that is lower than the first spring rate;
wherein the isolation spring is positioned between the hub and an intermediate member and wherein the transition spring is positioned between the intermediate member and the pulley;
wherein the pulley includes a first transition spring torque limit surface and the intermediate member includes a second transition spring torque limit surface, the first and second transition spring torque limit surfaces being positioned to engage one another after a first amount of movement of the transition spring during torque transfer in a first direction between the hub and pulley, and the first and second transition spring torque limit surfaces are positioned to engage one another after a second amount of movement of the transition spring that is smaller than the first amount of movement during torque transfer in a second direction between the hub and pulley, wherein the second amount of movement includes zero movement.

10. An isolator as claimed in claim 9, wherein the intermediate member at least partially encloses the isolation spring to prevent direct contact between the isolation spring and the pulley.

11. An isolator as claimed in claim 9, wherein the isolation spring is one of a plurality of isolation springs positioned in parallel with one another and the transition spring is one of a plurality of transition springs positioned in parallel with one another and in series with the isolation springs.

12. An isolator as claimed in claim 9, wherein the plurality of isolation springs include outer springs and inner springs nested within the outer springs.

13. An isolator as claimed in claim 9, further comprising a first isolation spring torque limit surface and a second isolation spring torque limit surface, wherein the first and second isolation spring torque limit surfaces engage one another to limit compression of the isolation spring during movement of the hub and the pulley relative to one another.

14. An isolator as claimed in claim 9, wherein the first and second transition spring torque limit surfaces are positioned to engage one another after a first amount of movement of the transition spring during torque transfer in a first direction between the hub and pulley, and the first and second transition spring torque limit surfaces are positioned to engage one another after a second amount of movement of the transition spring this is smaller than the first amount of movement, during torque transfer in a second direction between the hub and pulley, wherein the second amount of movement includes zero movement.

15. An isolator as claimed in claim 9, further comprising a bushing having selected frictional properties positioned between the hub and the pulley.

16. An isolator as claimed in claim 9, further comprising a seal member having a first lip engaged with the pulley and a second lip engaged with the hub, wherein the first and second lips face an interior chamber of the isolator and are urged against the pulley and the hub respectively by pressure in the interior chamber during operation of the isolator.

17. An isolator as claimed in claim 9, wherein the second spring rate is less than about 1 Nm/degree, and the first spring rate is between about 3 and 5 Nm/degree.

18. An isolator as claimed in claim 9, wherein the transition spring is a circumferentially arranged helical torsion spring, and wherein the isolation spring is a circumferentially arranged helical torsion spring.

* * * * *